United States Patent [19]

Kraus et al.

[11] Patent Number: 4,637,261

[45] Date of Patent: Jan. 20, 1987

[54] MASS-FLOW SENSING TRANSDUCER FOR INTERNAL COMBUSTION ENGINES

[76] Inventors: Robert A. Kraus; Edmund J. Kraus, both of 1636-T E. Edinger Ave., both of Santa Ana, Calif. 92705

[21] Appl. No.: 802,435

[22] Filed: Nov. 27, 1985

[51] Int. Cl.$^4$ .................... G01F 15/02; G01M 19/00
[52] U.S. Cl. ................................ 73/861.02; 73/118.2
[58] Field of Search ............... 73/118, 703, 717, 708, 73/861.47, 861.63, 729; 73/861.01, 861.02, 118.2

[56] References Cited

U.S. PATENT DOCUMENTS

| | | | |
|---|---|---|---|
| 2,959,054 | 11/1960 | Welkowitz | 73/861.02 |
| 2,985,018 | 5/1961 | Williams | 73/703 |
| 3,140,612 | 7/1964 | Houghton et al. | 73/703 |
| 3,691,824 | 9/1972 | Vanderbilt, Jr. et al. | 73/118 |
| 4,050,428 | 9/1977 | Masaki | 73/118 |
| 4,128,006 | 12/1978 | Grabow | 73/729 |
| 4,244,229 | 1/1981 | Pullen | 73/708 |
| 4,400,974 | 8/1983 | Nishimuta et al. | 73/118 |
| 4,406,161 | 9/1983 | Locke et al. | 73/118 |
| 4,408,589 | 10/1983 | Hauler et al. | 73/118 |
| 4,419,898 | 12/1983 | Zanker et al. | 73/861.02 |
| 4,502,325 | 3/1985 | Klump | 73/861.02 |

FOREIGN PATENT DOCUMENTS

| | | | |
|---|---|---|---|
| 3312092 | 10/1984 | Fed. Rep. of Germany | 73/118 |
| 985047 | 3/1965 | United Kingdom | 73/703 |

*Primary Examiner*—Michael J. Tokar
*Assistant Examiner*—Robert R. Raevis

[57] ABSTRACT

Apparatus for obtaining the mass flow rate of engine aspirated air. An ultrasonic transducer measures the density of atmospheric air, while coincidentally measuring the velocity of air within a venturi of an engine air induction tube. The two individual measurements produce a single electric output signal proportional to the mass flow rate of air.

10 Claims, 10 Drawing Figures

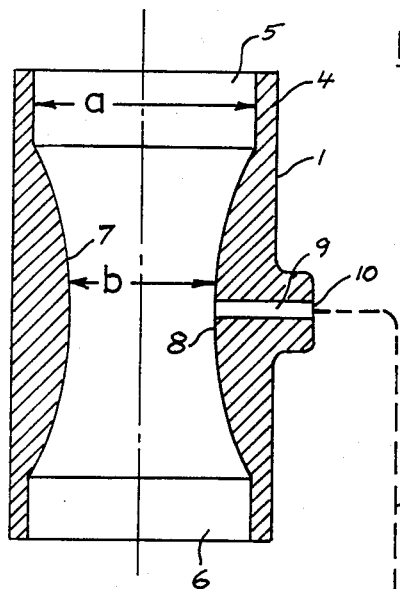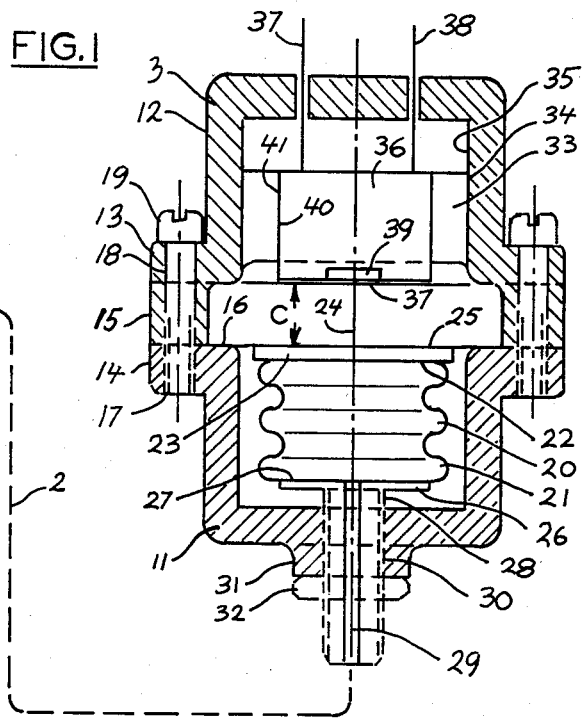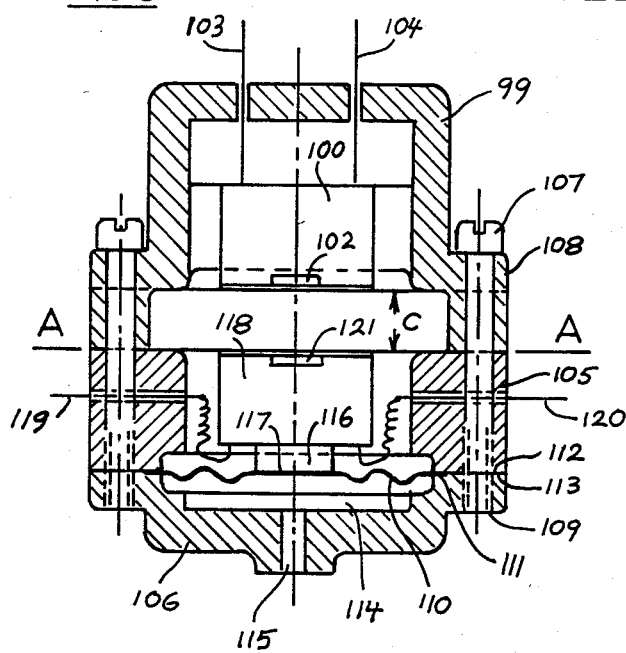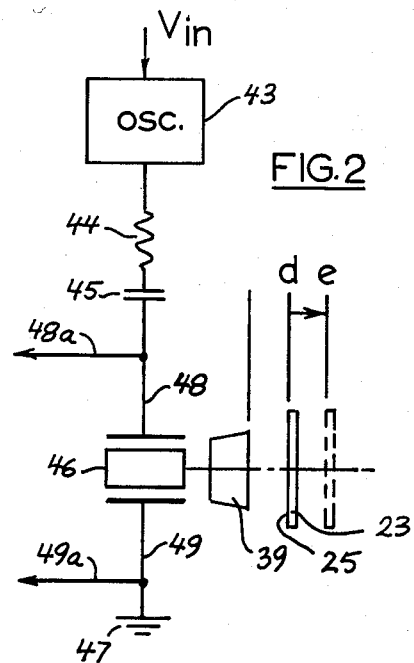

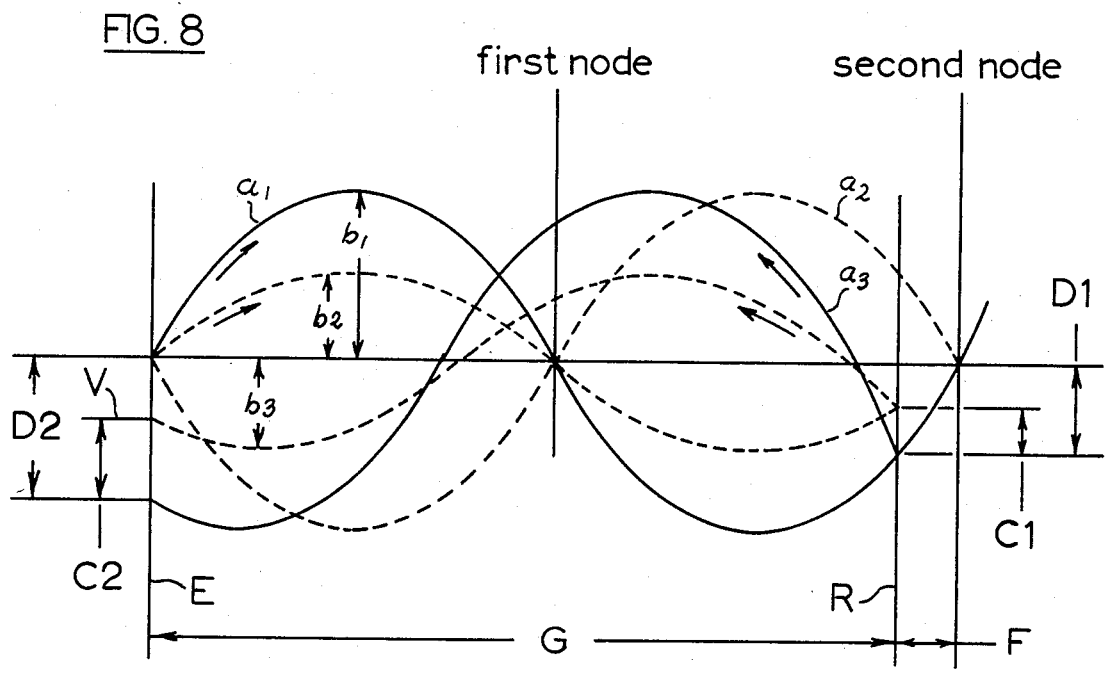
FIG. 8 — the first transducer
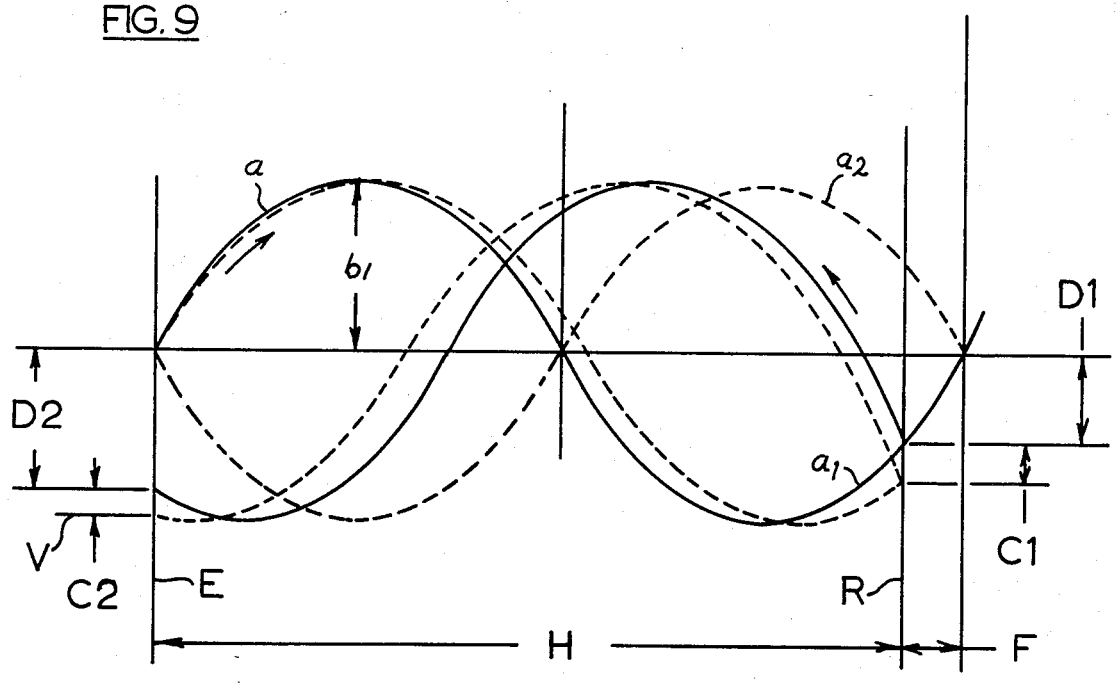
FIG. 9 — the second transducer

MASS-FLOW SENSING TRANSDUCER FOR INTERNAL COMBUSTION ENGINES

BACKGROUND OF THE INVENTION

The present invention relates to an improved engine fuel control systems, and more specifically to an engine fuel control system which compensates for changes in engine aspirated air due to changes in altitude, atmospheric temperature and/or barometric pressure as disclosed and claimed in our co-pending application Ser. No. 06/685,908 with the Title GAS-COUPLED TRANSDUCER DEVICE which is now abandoned; and as disclosed and claimed in our co-pending application Ser. NO. 06/788,634 with the title FUEL CONTROL SYSTEM FOR INTERNAL COMBUSTION ENGINES.

Several types of air flow rate sensing devices as part of engine fuel control systems are known to exist. One of which (a thermal flowmeter) is described in the U.S. Pat. No. 4,275,695. While being widely used, such thermal flowmeters are characterized by a multitude of shortcomings. Such as for instance, the pulsating, electric current flow within a heated wire located in the engine air induction tube, caused by pulsating heat exchange as a consequence of pulsating air flow in step with the opening and closing of the engine intake valves. Still other limitations may be found in the possible braking, and the formation of unwanted deposits on the heated wire. This, and other shortcomings may have adverse effects on the smooth operation of the engine fuel injection systems. To eliminate such shortcomings, requires extensive, and costly signal conditioning components. Other systems are described in the U.S. Pat. No. 4,311,042, and 4,457,167; whose principle of operation, except for the addition of electronic signal smoothing and linearizing components are basically as in the heretofore discussed system, and are therefore subject to basically the same limitations. While a still further U.S. patent with the U.S. Pat. No. 4,457,166 describes a device based on the subtraction of an appropriated number of Karman vortex pulses from a number of measured Karman vortex pulses.

SUMMARY OF THE INVENTION

To ascertain the mass flow rate of any gas in motion, it is necessary to know the cross sectional area at a certain measuring zone within a flow system under consideration; as it is necessary to know the velocity of the gas within said zone, and the density of the particular gas. Wherein, the cross sectional area times the velocity times times the density of the gas is equal to the mass flow rate, thereof. The preferred embodiments of the mass flow rate measuring device of the present invention serves a twofold purpose; first, to provide the engine fuel injector(s) with an electric signal to produce at any engine throttle position, engine speed and load as well as atmospheric condition the correct air/fuel mixture necessary for complete combustion within the cylinders of the engine; and second, to produce at any of the aforesaid conditions, the correct air/fuel mixture necessary to achieve the highest degree of fuel efficiency.

Since it is however difficult to measure the velocity of air within an engine air induction system, a section of the air induction tube is provided with an internally disposed, streamlined constriction having a throat of well defined cross sectional area; which makes it indirectly possible, to measure the velocity of air by measuring the decrease in pressure generated by the proportional increase in velocity as the air passes through the narrow venturi throat. Hence, since the cross sectional area at the point of measurement is a known constant, the rate of produced difference in pressure between the point of measurement and atmosphere may be utilized to indicate the volumetric rate of air flow.

The systems of the prior art require complex, multi-transducer measurements to produce an indirect, computer correlated electric output, proportional to the mass flow rate of air in motion, thereby increasing cost. Whereas, the embodiments of the present invention produce a single, electric output, which by virtue of simplicity, greatly reduces cost.

The mass flow sensing system of the present invention basically comprises two individual fluid communicative connected assemblies. One of which, is an air flow responsive component which does not require an electric input, nor does it provide an electric output. Whereas, the other assembly consists of an acoustically responsive component, which requires an electric input, to provide a modified electric output.

OBJECTS OF THE INVENTION

It is therefore an object of the present invention to provide low cost means for measuring the mass flow rate of engine aspirated air without the limitations, characteristic of the prior art.

Another object of the present invention is to provide a single, low cost transducer means for measuring the mass flow rate of air in motion.

A further object of the present invention is to provide an improved, low cost, and efficient engine fuel control system comprising mass flow sensing means for engine aspirated air.

A still further object of the present invention is to provide low cost means for making a single measurement on the mass flow rate of engine aspirated air while compensating for changes in concurrent atmospheric conditions.

Yet still another object of the present invention is to provide means for producing an electric signal proportional to the mass flow rate of engine aspirated air, which is utilized in controlling the fuel-injector(s) to obtain at any throttle position, engine load and environmental conditions a correct air/fuel mixture.

The features which are believed to be characteristic of the present invention, both as to their organization and method of operation, together with further objects and advantages will be better understood from the accompanying drawing which we have chosen for purpose of explaining the basic concept of the invention. It is to be clearly understood however, that the invention is capable of being implemented into other forms and embodiments within the scope and spirit of the defining claims by those skilled in the art, such as for instance applications involving the mass flow measurement of any gas, which other forms and embodiments will be taken advantage of.

BRIEF DESCRIPTION OF THE DRAWINGS

FIG. 1 represents the sectioned view of the preferred embodiment of the present invention comprising a venturi tube, and thereto fluid communicative connected, ultrasonic transducer.

FIG. 2 represents the electric diagram for the device in FIG. 1.

FIG. 5 represents an alternate embodiment comprising an ultrasonic ceramic emitter sub-assembly, and a separate, ultrasonic ceramic receiver sub-assembly.

FIG. 8 is a graphic illustration of the shift in phase of the first device in FIG. 3.

FIG. 9 is a graphic illustration of the shift in phase of the second device in FIG. 3.

DESCRIPTION

Figure 3:
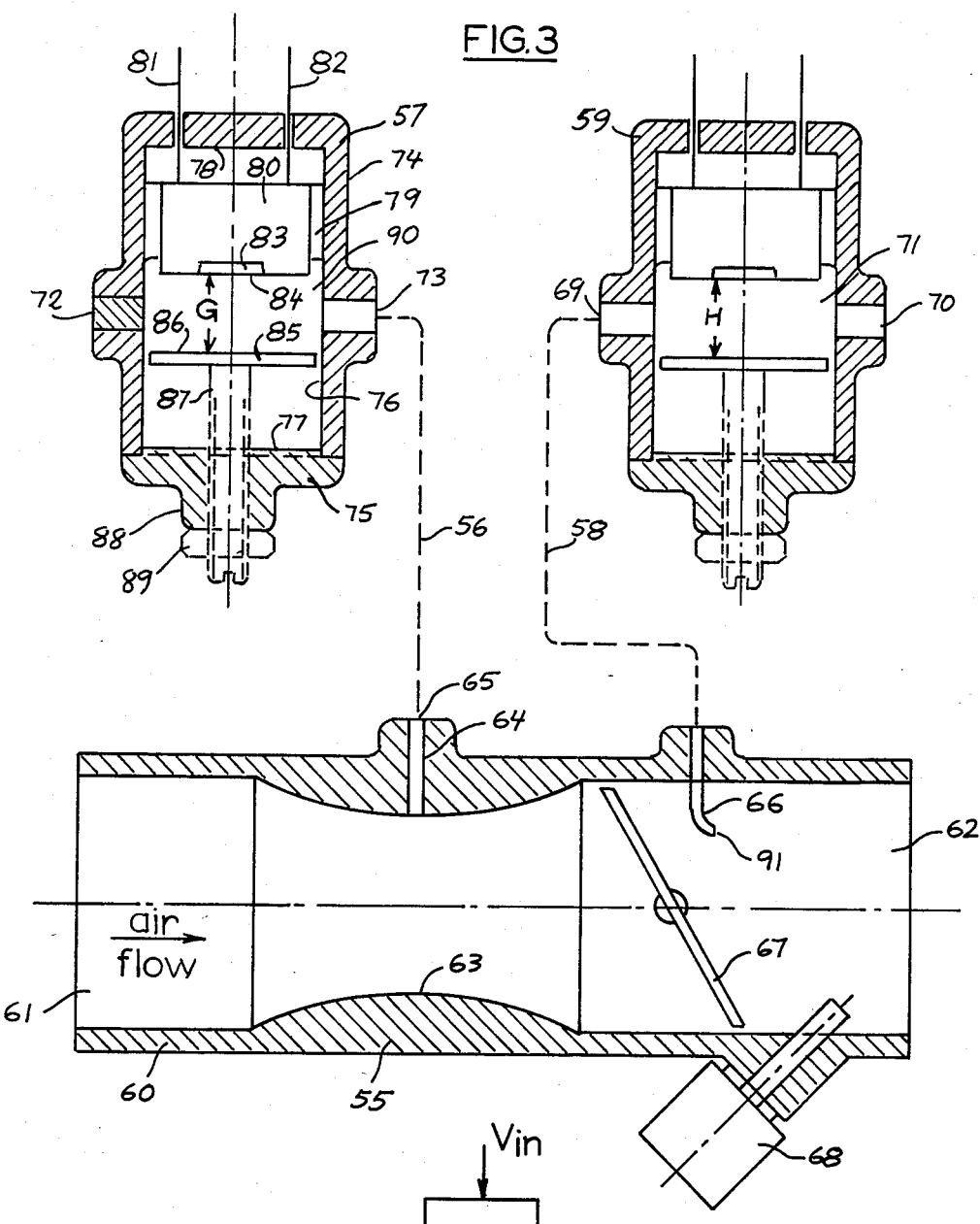
FIG. 3 represents the sectioned view of an alternate embodiment of the device in FIG. 1, comprising two ultrasonic transducers, one for measuring the volumetric rate of air flow, and the other, for measuring the density of atmospheric air.

In accordance with the preferred embodiment of the present invention, FIG. 1 represents the venturi tube 1 being connected via suitable fluid transport means 2, to the ultrasonic transducer assembly 3. The venturi tube consists of a length of tube 4 of cross sectional area (a), having the air inlet 5, and outlet 6; and comprises the internally disposed constriction 7 having a throat 8 of substantially reduced cross sectional area (b). The fluid communicative passageway 9 extends perpendicular to the main-stream of air flow from throat 8 to port 10 outward, so as to form via the fluid transport means 2, a fluid communicative relationship with the ultrasonic transducer assembly 3. The ultrasonic transducer assembly 3 comprises the first and second housing portions 11 and 12. The first as well as the second housing portions are provided with radially outward extending flanges 13 and 14. Flange 13 is provided with a series of longitudinally extending pegs 15 of the well defined length (c); whereas flange 14 is provided with the radially extending planar surface 16 having the internally treated apertures 17 being located so as to match the geometry of the longitudinally through pegs 15 extending apertures 18. A set of screws 19 extend trough apertures 18 of pegs 15 so as to combine, and securely fix the first and second housing portions by being in a threaded engagement with the internally threaded apertures 17 of flange 14. In the arrangement, pegs 15 serve the purpose of providing a series of large, circumferentially spaced openings between atmosphere and the device's interior. Housing portion 11 comprises the sub-assembly 20, having the axially flexible bellows 21, which is hermetically closed at end 22 by the disk like member 23 having the perpendicular to the center 24 oriented, planar wave reflecting surface 25. Sub-assembly 20 further comprises the disk like support member 26 which is hermetically fixed to bellows end 27. The disk like support member 26 comprises the threaded stem 28 having the longitudinal air passageway 29. Stem 28 extends in a threaded engagement with the internally threaded aperture 30 through housing boss 31, so that surface 25 of member 23 is axially adjustable, and fixed in the adjusted position, by tightening the nut 32 against the boss 31. Housing portion 12 comprises concentrically within disposed the annular, resilient member 33 being fixed by suitable means with its cylindrical outer wall 34 to the housing cylindrical inner wall 35. Housing portion 12 further comprises the piezoelectric, ultrasonic generator sub-assembly 36 (such as e.g., the Ultrasonic Ceramic Transducer being commercially available at Projects Unlimited, Inc.). Sub-assembly 36 comprises the electric leads 37 and 38, as well as comprises the piezoelectric ceramic element incorporating the single emitter-receiver element 39, which serves the dual functions of emitting, as well as of receiving acoustic energy in form of sonic pressure pulses. Sub-assembly 36 is concentrically disposed within resilient member 33, by being fixed via suitable means with its cylindrical outer wall 40 to the cylindrical inner wall 41 of member 33.

In operation, a constant stream of air enters inlet 5 of venturi tube 4 to pass the point of measurement at the narrowest portion of flow constricting throat 8. As the air enters the constriction, part of its pressure is converted to an proportional increase in velocity, accompanied by a proportional decrease in pressure at fluid passageway 9. The reduced pressure within venturi throat 8, causes a proportional axial contraction of bellows 21 as a consequence of higher atmospheric pressure being exerted on the outer surface 25 of member 23; which in turn, tends to increase the distance between wave reflector surface 25, and the wave emitting and receiving element 39 located at end 37 of the transducer sub-assembly 36. This function reverses, as the volumetric rate of flow within the venturi tube decreases, and thereby allowing the member 23 and bellows 21 to return to their equilibrium position.

FIG. 2, shows the oscillator 43 connected in series with resistor 44, capacitor 45, and the piezoelectric ceramic element 46 to ground 47. Wherein the electric lead 48 and lead 49 represent the leads 37 and 38 in FIG. 1. In the circuit, the crystal controlled oscillator produces an alternating electric output of stable frequency and amplitude, which is applied across the piezoelectric ceramic element 46 whose resonance frequency is equal to the oscillator frequency. Thereby, causing element 46 to vibrate mechanically in phase with the frequency of the applied electric current. The mechanical vibrations of piezoelectric ceramic element 46 and the thereto coupled emitter-receiver element 39 produces acoustic energy in form of pressure pulses which are propagated to the wave reflecting surface 25 of member 23, from where the they are reflected to return, and to impinge on the emitter-receiver element 39. The oscillator 43 is series connected with resistor 44 and capacitor 45 to form a constant current source of greater resistance than the impedance of the piezoelectric ceramic element 46; the output voltage at leads 48a, and 49a is therefore proportional to the impedance. Since the piezoelectric element will only produce mechanical vibrations when electrically stimulated at its resonant frequency, the change in the electrical impedance in a function of antiresonant frequencies generated by a shift in phase between the mechanical vibrations of the piezoelectric element and the thereon impinging reflected sonic waves. Whereby the shift in phase, may be the consequence of changes in air temperature, or changes in the distance between the emitter-receiver element 39, and the wave reflecting surface 25 of member 23; which in turn, is caused by the contraction or expansion of bellows 21.

Figure 7:
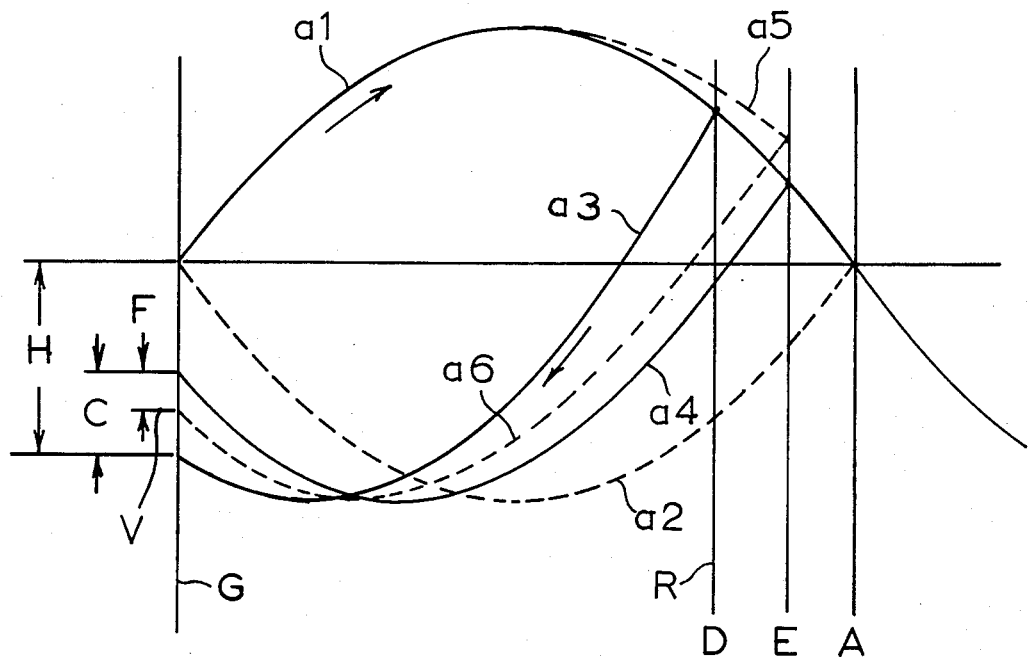
FIG. 7 is a graphic illustration of the shift in phase of the device in FIG. 1.

Referring to the diagram in FIG. 7. As shown, if the wave reflecting surface is located at the node, position (A) of the propagated wave (a1), the propagated, and the reflected wave (a2) will be in phase. The returning wave will therefore be in resonance with the emitting surface (G) of the piezoelectric element. At this condition, the piezoelectric element has a low impedance, and therefore causes the transducer output voltage to be high. At a no flow, and standard temperature condition through the venturi tube, the wave reflecting surface (R) is moved, to be fixed at position (D). Thereby causing the reflected wave (a3) to undergo the shift in phase as represented by (H). This in turn produces an antiresonance of high magnitude, thereby causing the piezoelectric element to change to a higher impedance, and inversely, causing the transducer output voltage to be low. Any movement of the wave reflecting surface (R) from position (D) toward position (E) or (A) caused by increasing air flow through the venturi tube, causes the reflected wave to undergo the shift in phase (C). Thereby lowering the antiresonance, as as well as the impedance of the piezoelectric element, accompanied by an inverse increase in transducer output voltage. In addition, either a leading, or a lagging shift in phase may occur as a consequence of changes in the velocity of sound, due to changes in the temperature of air between the emitting and reflecting surface. The diagram e. g., shows an increase in the temperature between the emitting and the reflecting surface, thereby causing the propagated wave (a1), to shift to (a5), and the returning wave to shift from (a4) to (a6). The total of which being represented by (F). This causes an additional antiresonance, accompanied by a proportional increase in impedance of the piezoelectric element, and hence causes an inverse lowering of the transducer output voltage. Wherein, the shift in phase (C) measures the volumetric rate of air flow through the venturi, minus the shift in phase (F) caused by the influence of changes in temperature of intervening air between the emitting and reflecting surface, hence: (C) minus (F) is equal to the transducer output as represented by the single output signal (V).

FIG. 3 represent an alternate embodiment of the present invention comprising the engine throttle-body device 55 being connected in a fluid communicative relationship via suitable fluid transport means 56 to the first ultrasonic transducer assembly 57, and via suitable fluid transport means 58 to the second ultrasonic transducer assembly 59. The throttle-body assembly 55, basically consists of a length of a suitable tube 60 being provided with the air inlet 61 and outlet and 62; and comprises the internally disposed, streamlined, venturi constriction having the narrow throat portion 63 of substantially reduced cross sectional area. The venturi constriction is provided with the fluid passage 64 extending laterally, relative to the mainstream of air flow from throat 63 to port 65 outward, so as to connect with fluid transport means 56. Throttle-body 55 further comprises the tubular member 66 extending downstream from the throttle valve 67 inward; and comprises further downstream the fuel injector 68. Except for the fluid communicative ports, the second transducer assembly is an exact duplication of the first transducer assembly. For purpose of simplicity therefore, only the component parts of the first assembly are provided with reference numbers which are also applicable to like parts of the second transducer assembly 59. The second housing structure comprises the port 69 which is fluid communicative connected to fluid transport means 58; as well as comprises port 70 which remains open to provide a fluid communicative passage between chamber 71 and atmosphere. Whereas, the first housing structure comprises a port which is hermetically closed by plug 72; as well as comprises the port 73 which is fluid communicative connected to fluid transport means 56. The cylindrical housing structure 74 is inherently closed at one end, while being closed at the opposite end via the end cap 75 so as to form a chamber defined by the cylindrical inner wall 76, and end walls 77 and 78. The annular member 79 made of a suitable resilient material is fixed by suitable means to the housing cylindrical inner wall 76 so as to coaxial retain by suitable means, the ultrasonic transducer sub-assembly 80. Subassembly 80 comprises the electric leads 81 and 82, as well as comprises the emitter-receiver element 83 at end 84. The disk like member 85 having the sound reflecting surface 86 is concentrically provided with an externally threaded stem 87, which is engaged with the internally threaded boss 88, so that the distance (G) between the emitter-receiver element 83 and surface 86 of the disk member 85 may be axially adjusted. To prevent air stagnation within chamber 71, and to assure the measurement of air at concurrent atmospheric conditions, the tubular member 66 by virtue of slightly lower than atmospheric pressure at aperture 91 continuously removes a small amount of air from within chamber 71, while maintaining atmospheric pressure within the chamber 71.

The diagram in FIG. 8 pertains to the first transducer of the alternate embodiment as shown in FIG. 3. As shown, if in the no flow condition through the venturi tube the wave reflecting surface is positioned at the second node, the propagated wave (A) possesses the fixed amplitude (b1), and the fixed frequency as represented by length (G) plus (F) given by the oscillator output frequency. Thus, when the wave reflecting surface is located at the second node, the propagated wave (a1) and the reflected wave (a2) will be in phase, thereby producing a resonance between the reflected wave and the emitting surface of the piezoelectric element. This in turn, causes the piezoelectric element to assume a low impedance, and hence, to produce a high transducer output voltage. Due to the fixed frequency of the propagated wave, the movement of the wave reflecting surface from the second node to distance (G) from the emitting surface, causes the fixed shift in phase indicated by (D1), and (D2), thereby causing an antiresonance of high magnitude, which in turn, causes the piezoelectric element to assume a high impedance, and hence, to produce a low transducer output voltage. An additional shift in phase may be caused due to lowering the air pressure between the wave emitting and the wave reflecting surface. That is to say, the transmissibility of sound through air may vary as the pressure, from high, at maximum pressure, to zero at a total vacuum. Any pressure change within the transducer causes therefore, an additional shift in phase. As may be seen in the diagram, a lowering in pressure causes the reduction in the amplitude (b1) of the propagated wave, to the lower amplitude (B2) represented by the dotted line. In operation, the venturi suction pressure causes a proportional change in air pressure between the wave emitting and the wave reflecting surface. The amplitude of the propagated wave (b2) and the reflected wave (b3) will therefore follow any change in venturi suction pressure. This in turn, causes the shift in phase (C1) and (C2) thereby lowering the impedance of the piezoelectric element, and hence, causing an inversely high transducer output voltage (V) of the first transducer, which indicates the volumetric flow rate through the venturi tube. The second transducer 59, whose purpose is to senses the density of atmospheric air between wave reflecting surface 86 and emitter-receiver element 83 is adjusted to distance (H) to match distance (G) of the first transducer 57.

The diagram in FIG. 9 pertains to the second transducer of the alternate embodiment as shown in FIG. 3. As shown, if in the no flow condition, the wave reflecting surface (R) is positioned at the second node, the propagated wave (a) possesses the fixed amplitude (b1), and the fixed frequency represented by length (H) plug (F) which is given by the oscillator frequency. Thus, when the reflecting surface is located at the second node, the propagated wave (a1) and the reflected wave (a2) will be in phase, which produces the resonance between the reflecting wave and the emitting surface (E) of the piezoelectric element. The resonance causes the piezoelectric element to have an inverse low impedance, and therefore to produce a high transducer output voltage. Due to the fixed frequency of the propagated wave, the movement of the reflector surface (R) from the second node to distance (H) from the emitter surface (E), causes the fixed shift in phase indicated by (D1), and (D2). Thereby giving rise to an antiresonance of high magnitude, which causes the piezoelectric element to assume a high impedance, and inversely, to produce a low transducer output voltage. As may be seen in FIG. 8, at a no flow condition, (D2) of the first transducer is equal to (D2) of the second transducer. Therefore, as may be seen in FIG. 4, when the first and the second transducers are connected in the bridge network, and (D2) of the first transducer is equal to (D2) of the second transducer, then, the electrical potential at points 94 and 95 will be the same. An meter connected between this points, will therefore show a zero reading. An additional shift in phase may occur dur to changes in the temperature between the wave emitting and the wave reflecting surface. Since the velocity of sound through air, varies with changes in air temperature, a temperature variation within the transducer will result in a sound velocity dependent shift in phase, either leading, or lagging, depending on the change in temperature. The diagram shows, an increase in the velocity of sound as a consequence of increased temperature between the wave emitting and the wave reflecting surface. Thereby, causing the additional shift in phase as indicated by the dotted line, which changes the dimensions (D1), to (C1), and (D2), to (C2). The additional sound velocity dependent shift in phase, causes the electrical impedance of the piezoelectric element to increase, and inversely to produce a lower transducer output voltage. The second transducer output voltage (V) will therefore follow any change in temperature between the wave emitting, and the wave reflecting surface.

In operation, both piezoelectric ceramic elements are driven by the same oscillator. Hence, both transducers will produce a coincidental propagation of acoustic waves, in step with the oscillator frequency, while serving independent functions. The independent functions of the first transducer 57 and second transducer 59 each, will produce an electric output of a different magnitude. Both, the first and the second transducer are therefore electrically connected, so as to provide a single electric output equivalent to both, the first, and second function.

Figure 4:
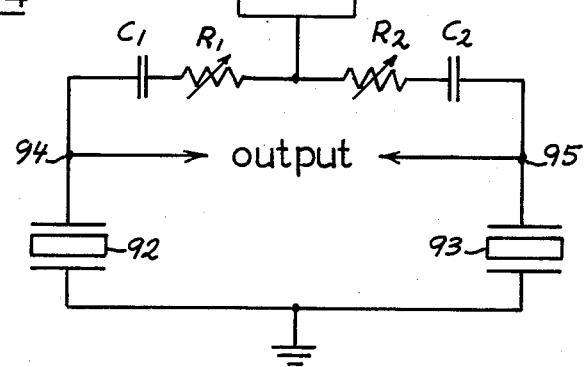
FIG. 4 represents the electric diagram for the device in FIG. 3.

FIG. 4 shows the electric circuit of the device in FIG. 3, wherein a single electronic oscillator receives driving current from a power supply not shown, to generate an alternating current of fixed frequency and amplitude. The oscillator is in line connected with resistors R1 and R2, capacitors C1 and C2, and the piezoelectric ceramic elements 92 and 93 to ground. Thereby forming a bridge network, wherein the electric output signal is provided at terminals 94 and 95, which may be connected to either a volt meter, or an automobile on-board electronic computer for controlling the incorporated fuel injection system.

FIG. 5, represents another alternate embodiment of the present invention, in which for reason of simplicity the housing upper portion 99 above line A-A is not described, since except for the concentrically within said upper housing portion disposed ultrasonic generator sub-assembly 100 having emitter element 102 and the input leads 103 and 104, all other parts are in all respects identical to housing portion 12 in FIG. 1. In FIG. 5, the arrangement of the upper housing portion 99, the annular second housing portion 105, and cup 106 are securely held together by the set of suitable screws 107 extending through the longitudinal apertures of flange 108, and housing portion 105 to be in threaded engagement with the internally threaded aperture 109 of end cup 106. A longitudinally flexible diaphragm 110 is securely held in a concentrically disposed position, and is hermetically sealed at its periphery 111, by being squeezed between the radially extending end wall 112 of housing portion 105, and the radially extending end wall 113 of end cup 106 so as to form the internal cavity 114 which via aperture 115, is in a fluid communicative relationship with the suction port of the venturi tube. A disk like member 116 is concentrically fixed by suitable means to center 117 of diaphragm 110, so as to bear a coaxial thereto fixed, ultrasonic receiver sub-assembly 118 having the output leads 119 and 120, and the receiver element 121 which possesses the same inhered, natural frequency, as does the emitter element 102. In operation, an electronic oscillator provides the piezoelectric ceramic emitter element 102 with an alternating driving current of sinusoidal, or square wave configuration, at a fixed frequency and fixed amplitude. Thereby exciting the emitter element to vibrate at the oscillator frequency. The mechanical vibrations generate, and propagate acoustic energy in form of wave motion at oscillator frequency and fixed amplitude, which is received by element 121.

Figure 10:
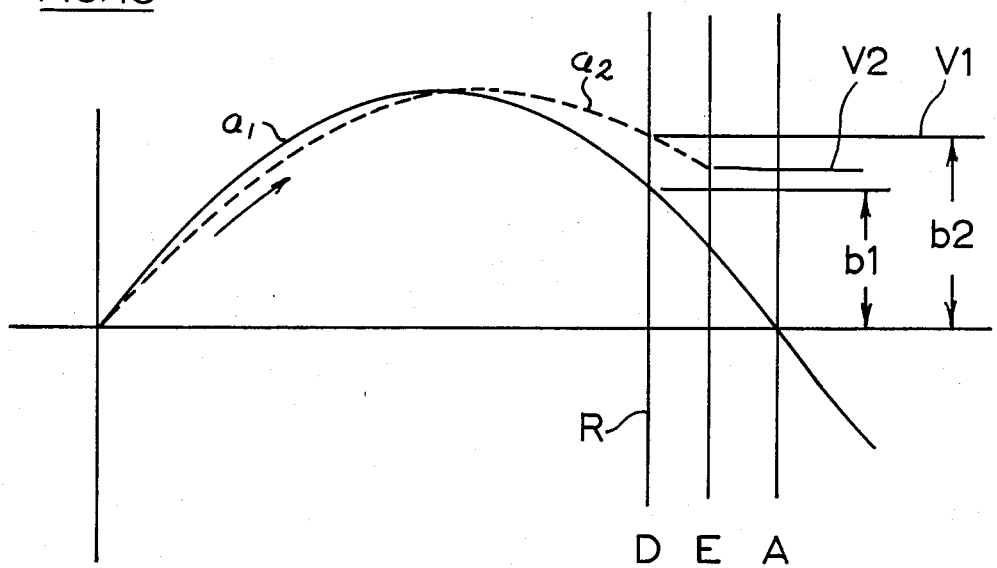
FIG. 10 is a graphic illustration of the shift in phase in FIG. 5.

Referring now to FIG. 10. Since the emitting, and the receiving piezoelectric elements in FIG. 5 possesses equal natural resonance frequencies, the impingement of the emitted waves on the receiving element produces the highest achievable resonance, when the receiving surface is positioned at nose (A); which in turn, produces, the highest achievable transducer output voltage. To obtain a gain in the volumetric flow rate dependent output voltage, the receiving surface of the piezoelectric element must be located at position (D), where, due to high antiresonance, and corresponding high impedance, the transducer produces a substantially lower output voltage. Therefore, any movement of the wave reflecting surface (R) from position (D) toward node (A) due to increase in suction pressure within cavity 114, causes an increase in transducer output voltage at a rate, proportional to the volumetric rate of air flow through the venturi tube. In addition, changes in air density, due to fluctuations in air temperature may change the transducer volumetric flow rate dependent output, either to a higher, or to a lower voltage. That is to say, a decrease in the temperature causes an increase in air density, and visa versa as the case may be. Since the velocity of sound in air increases with increasing temperature, the propagated wave undergoes the leading shift in phase, from (a1), to (a2). As may be seen in the diagram, the shift in phase, causes antiresonance to increase from (b1), to (b2), accompanied by increased electrical impedance of the piezoelectric element, and inversely by lowering the transducer output voltage as indicated by (V1). Any change in the distance between the emitting and the receiving element from position (D) to position (E) causes the lowering of antiresonance, accompanied by the lowering in impedance, and inversely by the increase of transducer output voltage. Therefore, the transducer output voltage (V2) represents the mass flow rate of air.

Figure 6:
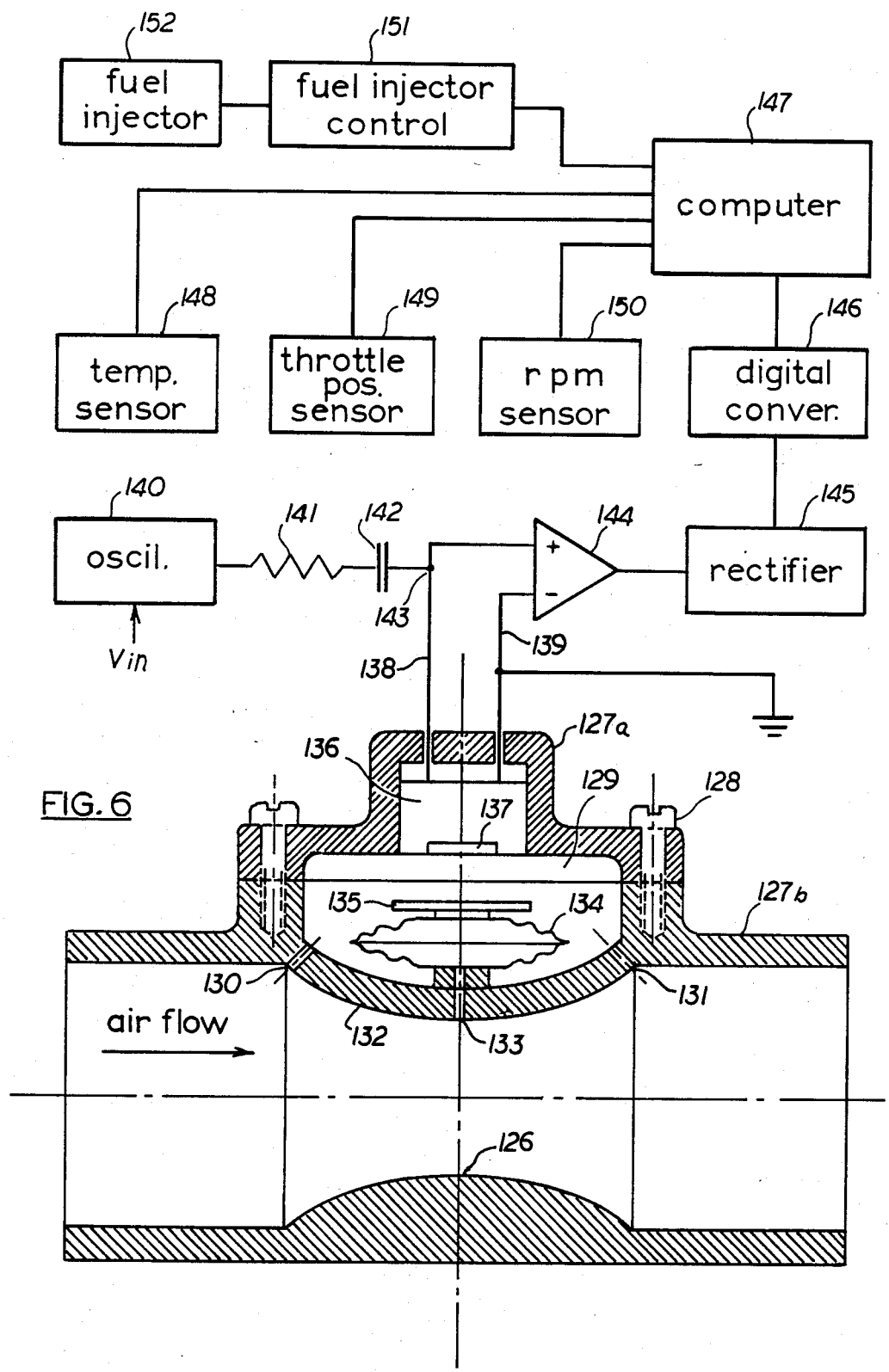
FIG. 6 represents a venturi tube having a integrally disposed ultrasonic transducer assembly, including electronic circuit block diagram.

FIG. 6 shows another alternate embodiment of the present invention, consisting of the venturi tube having the constriction 126. The upper housing portion 127a is securely fixed by screws 128 to the venturi housing 127b, so as to form the cavity 129. For purpose of venting cavity 129, to equalize the cavity internal pressure with pressure encountered before and after the venturi constriction, the cavity is fluid communicative connected via aperture 130 just upstream, and via aperture 131 just downstream of the venturi throat 132. To vent the interior of cavity 129, aperture 133 connects the venturi throat 132 fluid communicative with the interior of the flexible capsule element 134. The capsule element having concentrically thereto disposed, the wave deflecting member 135. The housing portion 127a comprises concentrically within disposed, the ultrasonic transducer sub-assembly 136 having the emitter-receiver element 137 and electric leads 138 and 139. In principle, the integrally constructed venturi-acoustical transducer device operates similar to the device in FIG. 1. Hence producing at leads 138 and 139 a single electric output from two independent functions. As may be seen in FIG. 6, the electronic circuit comprises the electronic oscillator 140 producing alternating current of a fixed frequency and amplitude. The oscillator output is series connected via resistor 141, and capacitor 142 to terminal 143, and via lead 138 across the ultrasonic generator 137 and lead 139 to ground. Terminal 143 is connected in series via amplifier 144, rectifier 145, digital converter 146, to computer 147. For use in automobile on-board applications in addition, a engine temperature sensor 148, throttle position sensor 149 and the distributor RPM sensor 150 are also connected to the computer 147, which correlate all input data to provide the fuel injector control unit 151 with an electric signal which is further processed by said control unit to produce an electric signal for driving the fuel injector(s) 152.

What is claimed is:

1. Apparatus for measuring the mass flow rate of air, by performing separate air density, and air flow rate sensing functions, and to provide a single electric output signal relevant thereto, comprising in combination:
    a. flow obstruction means comprising housing means provided with an air inlet and an air outlet at axial ends thereof, a venturi constriction having a narrow throated portion, and fluid passageway from within said narrow throat to a suction port;
    b. ultrasonic device for causing a shift in phase of propagated sonic waves between two elements within a confined space;
    said ultrasonic device comprising first housing portion having concentrically disposed a first cavity, and second housing portion having concentrically disposed a second cavity, each being defined by a cylindrical inner surface and an end wall, said housing portions having suitable means for longitudinal separation to a given distance from each other, so as to form radially extending, fluid communicative passageways from within said cavities to atmosphere; and means for fastening said first and second housing portions to each other; said first cavity houses concentrically within disposed a single ultrasonic generator means, having electric terminals, and centrally disposed, a single piezoelectric element, having leads connected to said terminals, and being disposed to face said second housing portion; said second cavity houses a wave reflecting means facing said piezoelectric element at a specified distance of no less than one quarter wave length apart; said wave reflecting means being fixed to a hermetically sealed, pressure responsive means so as to establish a coaxial relationship between said pressure responsive means, said wave reflecting means, and said ultrasonic generator means; said pressure responsive means having a fluid communicative passageway from within said pressure responsive means; said passageway being fluid communicative connected to said suction port, whereby occurring pressure changes at said suction port causes axial movement of said wave reflecting means, thereby causing a shift in phase of propagated ultrasonic waves between said wave reflecting means and said piezoelectric element; said ultrasonic device further comprises, sequentially connected, electronic oscillator means for generating a fixed oscillator frequency and amplitude, resistance means, and said ultrasonic generator means for generating ultrasonic waves equal to said oscillator frequency; wherein said piezoelectric element of said ultrasonic generator means possesses a natural resonant frequency equal to said oscillator frequency; and wherein in operation said resistance means serves to maintain a constant current flow through said piezoelectric element; said resistance being substantially greater than the impedance of said piezoelectric element, wherein variations in said impedance causes the voltage at said terminals to follow said impedance; and wherein the variations in impedance is a function of antiresonant frequency caused by a shift in phase between the vibrations of the piezoelectric element, and the returning waves impinging on said piezoelectric element; and wherein said shift in phase is a consequence of changes in air temperature and the distance between said piezoelectric element and said wave reflecting element; thereby causing an electric output signal at said terminals being proportional to said mass flow rate.

2. Apparatus according to claim 1, wherein said electric output signal of said ultrasonic device is connected via rectifier and digital converter to a microprocessor.

3. Apparatus according to claim 1, comprising means for mechanical adjustment of the distance between said wave reflecting means and said piezoelectric element.

4. Apparatus according to claim 1, wherein said electric output signal of said ultrasonic device is connected to an automobile on-board electronic computing means for regulating air/fuel mixture.

5. Apparatus for measuring the mass flow rate of air, by performing separate air density, and air flow rate sensing functions, and to provide a single electric output signal relevant thereto, comprising in combination:
  a. flow obstruction means comprising housing means provided with an air inlet and an air outlet at axial ends thereof, a venturi constriction having a narrow throated portion, and fluid passageway from within said narrow throat to a suction port;
  b. first ultrasonic device for measuring the density of air within a confined space, said first device comprises a housing means having internal chamber defined by cylindrical inner surface and first and second end walls; said chamber having at least one fluid passageway connected from within to said suction port; and chamber houses concentrically disposed at said first end wall a first ultrasonic generator means having a single piezoelectric element having first and second electric terminals; said chamber further houses concentrically disposed a wave reflecting means being fixed in position to face said piezoelectric element at a distance of no less than one quarter wave length;
  c. second ultrasonic device for measuring the density of air at atmospheric conditions; said second device comprising a housing means having an internal chamber defined by cylindrical inner surface and first and second end walls; said chamber having at lease one fluid passageway from within to atmosphere; said chamber houses concentrically disposed at said first end wall a second ultrasonic generator means having a single piezoelectric element having first and second terminals; said chamber further houses concentrically disposed a wave reflecting means being fixed in position to face said piezoelectric element at a distance of no less than one quarter wave length;
wherein in operation, a single, electronic oscillator provides alternating driving current of a fixed frequency and amplitude to said first and said second ultrasonic generator means, thereby producing within said first and said second device, acoustic energy in form of longitudinally propagating pressure pulses; said pressure pulses being reflected within each device by said wave reflecting means so as to be received by said piezoelectric elements; and wherein changes in air pressure within said first device causes a volumetric air flow dependent electric output signal; and said change in air pressure and temperature within said second device causes an air density dependent output signal; and wherein said volumetric flow dependent and said air density dependent electric output is combined within a suitable bridge network to produce a single electric output relevant to changes in said mass flow rate of air.

6. Apparatus according to claim 5, wherein said wave reflecting means of said first and said second ultrasonic device comprises axial adjustment means for changing and fixing the distance between said piezoelectric element and said wave reflecting means.

7. Apparatus according to claim 5, wherein said first and said second housing means is constructed to form a single unit.

8. Apparatus for measuring the mass flow rate of air, by performing separate air density, and air flow rate sensing functions, and to provide a single electric output signal relevant thereto, comprising in combination:
  a. flow obstruction means comprising housing means provided with an air inlet and an air outlet at axial ends thereof, a venturi constriction having narrow throated portion, and fluid passage from within said narrow throat to a suction port;
  b. ultrasonic device for causing a shift in phase of propagated sonic waves between two elements within a confined space; said ultrasonic device comprising a first housing portion having concentrically disposed a first cavity, and a second housing portion having concentrically disposed a second cavity, each cavity being defined by cylindrical inner surface and an end wall, said housing portions having suitable means for longitudinal separation to a given distance from each other, so as to form radially extending, fluid communicative passageways from within said cavities to atmosphere; and means for fastening said first and second housing portions to each other;
said first cavity houses concentrically within disposed a first ultrasonic assembly having electric input leads, and centrally disposed, a piezoelectric emitter element positioned, so as to face said second housing portion; said second cavity houses concentrically within disposed a second ultrasonic assembly having electric output leads, and centrally disposed, a piezoelectric receiver element positioned so as to face said emitter element at a well defined distance; said second ultrasonic assembly being fixed to a hermetically sealed, pressure responsive means so as to establish a coaxial relationship between said pressure responsive means, said emitter element, and said receiver element;
  said pressure responsive means having fluid communicative passageway from within to said suction port, whereby pressure changes at said fluid passageway causes axial movement of said pressure responsive means;
wherein in operation, an electronic oscillator provides alternating driving current of fixed frequency and amplitude to said first ultrasonic assembly, thereby generating acoustic energy in form of longitudinally propagating pressure pulses; said pressure pulses being received by said second ultrasonic assembly, thereby generating an alternating electric output signal proportional to said mass flow rate of air.

9. A device for measuring the mass flow rate of a gas by performing separate gas density, and gas flow rate sensing functions, and to provide a single electric output signal relevant thereto, comprising:
  a. ultrasonic device for causing phase shifting of ultrasonic waves between a first and a second element within a bounded space; said ultrasonic device comprising a first rigid housing means having internal cavity being defined by cylindrical inner surface having axial center thereof and first and second end walls, said first end wall having means for axially fixing a single piezoelectric element having electric terminals and acoustic wave emitting surface said emitting surface being in position to face said second end wall; said second end wall having means for axially disposing a pressure responsive element having acoustic wave reflecting surface being in position, whereby said wave reflecting surface faces said wave emitting surface through a distance of no less than one quarter wave length; said pressure responsive element is hermetically sealed and axially responsive to pressure;
  b. flow obstruction comprises second rigid housing means being part of said first rigid housing means and being provided with an gas inlet and an gas outlet at axial ends thereof, and a venturi constriction having a narrow throat, and fluid communicative passageway from within said throat to within said pressure responsive element, whereby pressure variations within said passageway causes axial movement of said reflecting surface, said cavity having first and second fluid communicative passageways, said first passageway leading to a port located upstream of said constriction, and said second passageway leading to a port located down stream of said constriction;

c. means for sequentially connecting between a power supply and ground, an electronic, crystal controlled oscillator means for generating a stable oscillator frequency, resistance means and said piezoelectric element; said piezoelectric element possesses a fixed resonance frequency equal to said oscillator frequency, and wherein in operation, said resistance means serves to maintain a constant current flow through said piezoelectric element; whereby the resistance of said resistance means is substantially greater than the electrical impedance of said piezoelectric element wherein variations in impedance causes voltage changes on said terminals to follow said impedance; whereby said variations in electrical impedance is a function of anti-resonant frequencies generated by a shift in phase between reflected and returning acoustic waves, and the mechanical vibrations of said piezoelectric element; and wherein said shift in phase is the consequence of changes in the distance between said emitting and reflecting surface, and changes in gas temperature; which causes said single electric output signal of said device to be equal to said mass flow rate of gas.

10. Device for causing a shift in phase of ultrasonic waves between two elements within a bounded space, so as to provide air pressure, and separate air density measuring functions, while producing a single electric output signal relevant thereto; comprising:

a first housing portion having a concentrically deposed first cavity; a second housing portion having a concentrically disposed second cavity, each being defined by a cylindrical inner surface and an end wall, said housing portions having suitable means for longitudinal separation to given distance from each other, so as to form radially extending fluid communicative passageways from within said cavities to atmosphere; and means for fastening said first and second housing portions to one another; said first cavity having means for fixing concentrically within disposed, an ultrasonic device having electric terminals and a single, centrally disposed piezoelectric element, having acoustic wave emitting surface and leads connected to said terminals, and being disposed to face said second housing portion; said second cavity having means for fixing concentrically within disposed, a pressure responsive element having a acoustic wave reflecting surface disposed to face said acoustic wave emitting surface at a distance of no lees than one quarter wave length; said pressure responsive element being hermetically sealed, and being axially responsive to applied pressure; means for sequentially connecting between a power supply and ground, an electronic, crystal controlled oscillator means for generating a stable oscillator frequency, resistance means and said piezoelectric element; said piezoelectric element possesses a fixed resonance frequency equal to said oscillator frequency, and wherein in operation, said resistance means serves to maintain a constant current flow through said piezoelectric element; whereby the resistance of said resistance means is substantially greater than the electrical impedance of said piezoelectric element wherein variations in impedance causes voltage changes on said terminals to follow said impedance; whereby said variations in electrical impedance is a function antiresonant frequencies generated by a shit in phase between said emitted and returned acoustic waves and the mechanical vibration of said emitting surface; and wherein said shift in phase is the consequence of changes in the distance between said emitting and said reflecting surface, and changes in the temperature of air; thereby causing said single electric output signal of said device to change as said shift in phase.

* * * * *